(12) United States Patent  
Heberle et al.

(10) Patent No.: US 7,290,400 B2
(45) Date of Patent: Nov. 6, 2007

(54) STATIONARY VEHICLE AIR CONDITIONING SYSTEM AND METHOD

(75) Inventors: Arthur Heberle, Mannheim (DE); Marcus Weinbrenner, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 10 days.

(21) Appl. No.: 11/107,012

(22) Filed: Apr. 15, 2005

(65) Prior Publication Data

US 2006/0042284 A1   Mar. 2, 2006

(30) Foreign Application Priority Data

Sep. 1, 2004   (DE) ...................... 10 2004 042 679

(51) Int. Cl.
*B60H 1/32*   (2006.01)
(52) U.S. Cl. .............................. 62/183; 62/239; 62/507
(58) Field of Classification Search .................. 62/183, 62/239–244, 236, 428–429, 507–508
See application file for complete search history.

(56) References Cited

U.S. PATENT DOCUMENTS

| | | | | |
|---|---|---|---|---|
| 3,390,539 A | * | 7/1968 | Miner | 62/184 |
| 3,719,058 A | | 3/1973 | Waygood | |
| 3,984,224 A | * | 10/1976 | Dawkins | 62/89 |
| 4,051,691 A | | 10/1977 | Dawkins | |
| 4,075,865 A | * | 2/1978 | Wills | 62/183 |
| 4,134,274 A | * | 1/1979 | Johnsen | 62/179 |
| 4,590,772 A | * | 5/1986 | Nose et al. | 62/184 |
| 4,825,663 A | | 5/1989 | Nijjar et al. | |
| 4,873,837 A | | 10/1989 | Murray | |
| 5,138,844 A | * | 8/1992 | Clanin et al. | 62/89 |
| 5,205,130 A | | 4/1993 | Pannell | |
| 5,333,678 A | | 8/1994 | Mellum et al. | |

(Continued)

FOREIGN PATENT DOCUMENTS

DE   3345340 A1   6/1985

(Continued)

OTHER PUBLICATIONS

European Search Report.

*Primary Examiner*—William E. Tapolcai
(74) *Attorney, Agent, or Firm*—Leydig, Voit & Mayer, Ltd.

(57) ABSTRACT

The invention pertains to a stationary vehicle air conditioning system with a refrigerant circuit, in which a compressor circulates refrigerant through a refrigerant circuit including at least one condenser. The one compressor may be powered by the vehicle's mechanical power, by an electrical source, or by a combination of these driving forces. Depending on desired operating characteristics, a plurality of condensers may be arranged in a series or parallel configuration within the circuit, and a second compressor also may be added, which second compressor may be powered by a source other than the mechanical energy of the vehicle's engine. A plurality of fans may be positioned and selectively operable to provide cooling air streams to one or more of the condensers, with the vehicle engine mechanically driving one fan and an electrical power source driving another fan. At minimum, at least one fan is provided to provide a cooling air stream to one or more condensers, wherein the fan is a hybrid drive unit that is capable of being driven through mechanical or electrical means.

10 Claims, 20 Drawing Sheets

U.S. PATENT DOCUMENTS

| | | | |
|---|---|---|---|
| 5,385,030 A * | 1/1995 | Kitagawa et al. | 62/160 |
| 6,205,802 B1 | 3/2001 | Drucker et al. | |
| 6,606,872 B1 * | 8/2003 | Smith | 62/175 |
| 6,932,148 B1 | 8/2005 | Brummett et al. | |
| 7,055,337 B2 | 6/2006 | Horn et al. | |
| 2006/0042285 A1 | 3/2006 | Herberle et al. | |
| 2006/0042286 A1 | 3/2006 | Herberle et al. | |

FOREIGN PATENT DOCUMENTS

| | | |
|---|---|---|
| DE | 43 24 071 | 1/1995 |
| DE | 4324071 A1 | 1/1995 |
| DE | 44 14 547 | 11/1995 |
| DE | 198 38 880 | 3/2000 |
| DE | 19917811 A1 | 3/2000 |
| DE | 10065279 C1 | 7/2002 |
| DE | 102 24 754 | 12/2003 |
| DE | 10242369 A1 | 3/2004 |
| DE | 103 48 578 | 4/2004 |

* cited by examiner

STATIONARY VEHICLE AIR CONDITIONING SYSTEM AND METHOD

CROSS-REFERENCE TO RELATED APPLICATIONS

This patent application claims the benefit of German Patent Application No. DE 10 2004 042 679.1, filed Sep. 1, 2004, which is hereby incorporated by reference.

FIELD OF THE INVENTION

The invention pertains to a vehicle air conditioning system and method, and more particularly, to an air conditioning system that is particularly advantageous for use with a vehicle in which the engine is not running (a "stationary vehicle"). The invention may be employed, for example, with a truck having a first air conditioner in the driver's compartment and a second air conditioner in a sleeping compartment. The air conditioning system and method includes a plurality of components that may be operated in a first mode while the engine is running and in a second mode while the engine is not running.

BACKGROUND OF THE INVENTION

German patent application DE 44 14 547 A1 describes a stationary vehicle air conditioning system in which the vehicle engine mechanically drives a first compressor and a DC electric motor powered by auxiliary vehicle batteries electrically drives a second compressor connected in parallel thereto. In normal operation, i.e., with the engine running, the first compressor circulates the refrigerant in the refrigerant circuit without the assistance of the second compressor, and, in stationary operation, i.e., with the engine off, the second compressor circulates the refrigerant without the assistance of the first compressor. The cooling of the refrigerant in each case takes place in a condenser arranged downstream of the junction of the two branches. This arrangement of components does not permit the systems to operate in an optimal manner.

Other types of stationary air conditioning systems with a cold storage unit are also known in the art, but such cooling systems typically require an undesirable charging time. There is thus a need for a stationary air conditioning system that permits the components to operate in a more optimal manner and without an undesirable charging time.

BRIEF SUMMARY OF THE INVENTION

A stationary vehicle air conditioning system with a refrigerant circuit is provided. The circuit includes at least one compressor, which circulates refrigerant within the circuit and which can be driven with an electrical or a mechanical source. An air cooled condenser for cooling the refrigerant coming from the compressor is also arranged in the circuit. In a preferred embodiment of the invention, two fans are provided, each of which provides an air stream in a different vehicle operating mode. One fan is driven mechanically with the aid of the vehicle engine, and the other fan is driven electrically. Alternatively, a fan can be provided with a hybrid drive unit that can be driven both electrically and mechanically. The provision of a mechanically drivable fan allows simple regulation, and, more particularly, engine speed dependent regulation. This arrangement is advantageous in that available energy is optimally utilized when the vehicle engine is running, which is a first mode of vehicle operation. In contrast, less power is necessary when the vehicle engine is stopped, which is a second mode of vehicle operation. In this latter vehicle operating mode, an electric motor suffices to drive the fan.

Two differently drivable fans can also be arranged at one condenser. In this embodiment, a separate fan provides a cooling air stream depending on the vehicle's operating mode. As an alternative embodiment, a plurality of condensers are arranged within the refrigerant circuit, wherein a separate fan provides an air stream for each condenser. Each fan may further differ in drive mode. Thus, a first fan may be mechanically driven and may supply an air stream to a first condenser in a first vehicle mode of operation, whereas a second fan may be electrically driven and may supply an air stream to a second condenser in a second vehicle mode of operation. The condensers within the circuit can be selected depending on the cooling requirements and demands, thereby optimizing the mix of cooling components and/or the performance of the refrigeration circuit.

In an environment in which multiple condensers are deployed, it may be preferable to couple such condensers in series depending on the requirements of the cooling circuit. For those applications not optimized by such a series connection, it is also possible to arrange multiple condensers in a parallel relationship. As yet a further alternative, it may be desirable to selectively couple a second condenser to a first condenser, either in a series or parallal relationship, only during a stationary operating mode, i.e., when the vehicle engine is stopped. In this latter arrangement, the first condenser is preferably cooled by a mechanically driven fan and a second condenser is cooled by an electrically driven fan. A bypass around the first and/or second condenser can also be provided. Refrigerant flowing through each condenser will naturally transfer heat even if a cooling air stream is not present. The compressor, however, must supply additional power to circulate coolant through each additional component within the circuit. It may be advantageous, therefore, to include a bypass around one or more condensers if the heat transfer resulting from the refrigerant passing through such condenser is outweighed by the increased energy required to force the refrigerant through such condenser. In the case of at least a partial flow in stationary operation, where less refrigerant is required as a rule, the condenser, given an appropriate configuration, can preferably also serve as a receiver, or as an additional receiver if one or more other receivers are provided in the refrigerant circuit.

The stationary vehicle air conditioning system, which includes a front and rear air conditioner, may also include two refrigerant sub-circuits. The sub-circuits are part of a larger refrigerant circuit which is split into branches that independently circulate refrigerant under certain operation conditions. The ability to split the larger circuit into one or more sub-circuits permits the cooling performance of the air conditioners to be optimized. The refrigerant sub-circuits can preferably be connected so that, particularly in normal operation, only one refrigerant sub-circuit is operable, and in stationary operation two refrigerant sub-circuits are operable.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Figure 1:
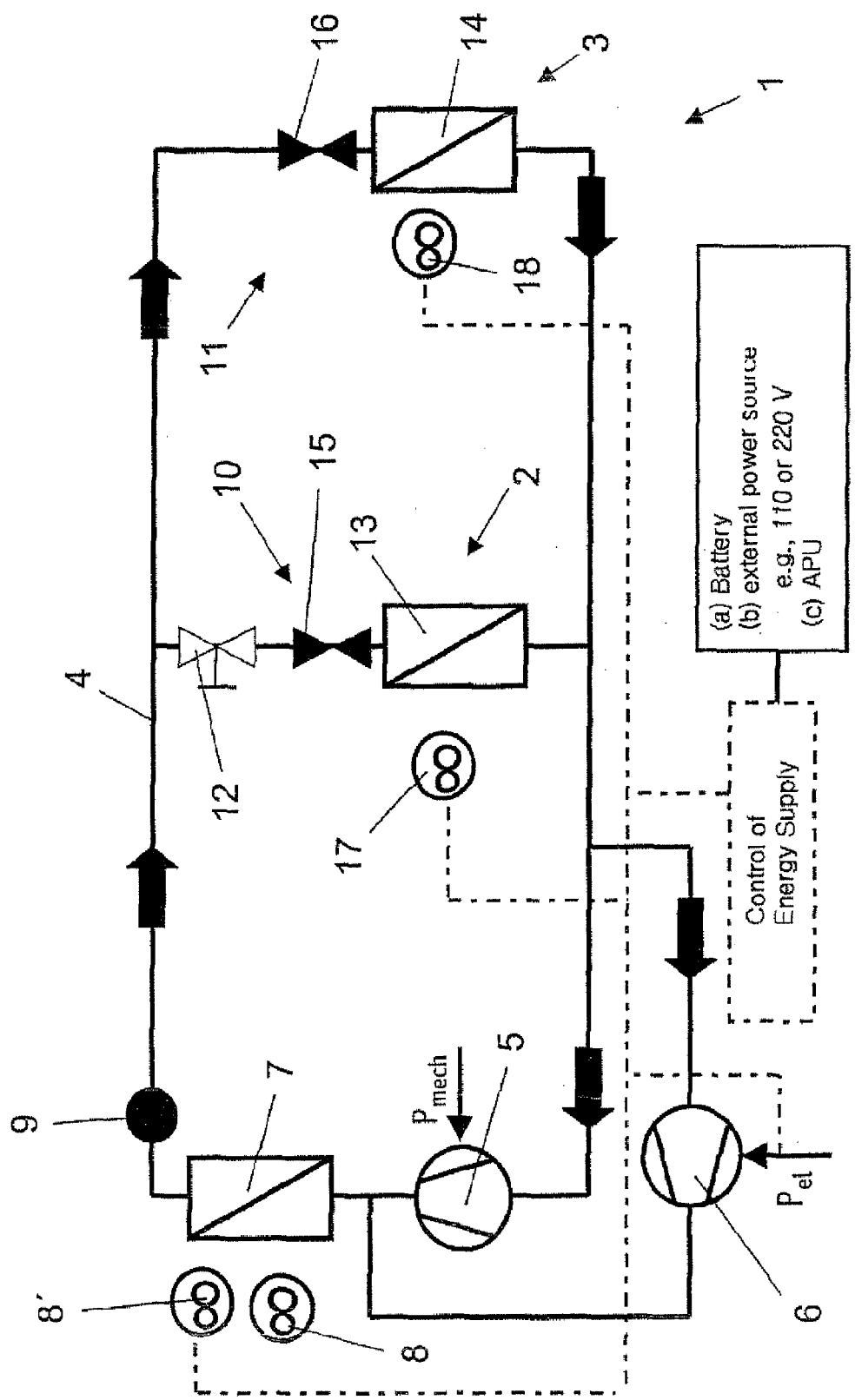
FIG. 1 is a simplified representation of a refrigerant circuit according to a first embodiment.

FIG. 1 illustrates a vehicle air conditioning system 1 with a front air conditioner 2 and a rear air conditioner 3 includes a refrigerant circuit 4. A vehicle air conditioning system 1 according to the invention as in one of the embodiments described below can preferably be used in a truck with an area such as a sleeping compartment that is separate from the driver's compartment, with front air conditioner 2 being located in the driver's compartment and a rear air conditioner 3 in a separate area of the vehicle.

A belt driven first compressor 5, which is powered with the aid of the vehicle engine, circulates refrigerant through circuit 4 in normal operation, i.e., while the engine is running. In stationary operation, i.e., with the motor stopped, the first compressor likewise is stopped, and a second compressor 6 is driven electrically by means of batteries or an external (AC) power source or an auxiliary power unit (APU). The electric power source is indicated in all figures with dashed lines.

In a first embodiment of the invention, as illustrated in FIG. 1, two compressors 5 and 6 are arranged in parallel branches of refrigerant circuit 4. In order to prevent backflow when second compressor 6 is not running, a check valve (not shown) is arranged in the corresponding branch of refrigerant circuit 4, downstream of second compressor 6 in the direction of refrigerant flow. A matching check valve can also be provided in the other branch downstream of first compressor 5.

The flow of refrigerant through circuit 4 in "normal" operation, i.e., with the vehicle's engine running, will be described first. Compressor 5 drives refrigerant, which is hot as a result of compression, through a condenser 7 that is cooled by air via a first vehicle-engine driven fan 8. Condenser 7 may be further cooled by wind or by an air stream generated through the motion of the vehicle. Downstream of condenser 7, a receiver 9 collects and temporarily stores excess liquid refrigerant.

As illustrated in FIG. 1, refrigerant circuit 4 splits into two branches at a location downstream of the first receiver 9, which branches 10 and 11 are associated with air conditioners 2 and 3, respectively. Valve 12 in branch 10 selectively opens and closes the flow of refrigerant through air conditioner 2. Depending on the state of valve 12, the refrigerant passes through through an expansion member 15 and/or 16 prior to reaching respective evaporators 13 or 14. As is known in the art, expansion members 15 and 16 permit refrigerant to expand and thereby transfer heat. Associated with each evaporator 13 and 14 is an electrically driven fan 17 and 18, respectively, which convey air through evaporator 13 and 14, respectively, and into the respective climate control zone. After flowing through evaporators 13 and 14 the refrigerant streams are reunited and returned to first compressor 5 in normal operation.

In stationary operation, i.e., a second, electrically-driven compressor 6 forces refrigerant to circulate through circuit 4. First compressor 5, which relies on the vehicle engine's mechanical power, is inactive. Likewise, fan 8, which also relies on the vehicle engine's mechanical power, is inactive. The refrigerant thus first flows through condenser 7 that has no air being conveyed to it by first fan 8. Provided alongside first fan 8, however, is a second fan 8' that is electrically actuated in stationary operation. Second fan 8' provides a sufficient volume of air to cool the refrigerant flowing through condenser 7. The subsequent sequence corresponds to normal operation, with the refrigerant returning to compressor 6 because compressor 5 is not running.

In the embodiment illustrated in FIG. 1, second fan 8' may be selectively operated even while the vehicle engine is running. This operating mode may be desired if demands upon the refrigerant circuit exceed the ability of the first fan 8 to cool refrigerant passing through condenser 7. In this arrangement, the activation and/or regulation of second fan 8' can be dependent upon refrigerant temperature, ambient temperature, and/or engine speed.

It is noted that in certain embodiments of the invention, such as the embodiment illustrated in FIG. 1, refrigerant flows through parallel connected compressors. In these types of arrangements, refrigerant tends to accumulate in certain components during stationary operation. In particular, a parallel connected and inoperative compressor can accumulate an undesirably high amount of excess refrigerant, which can in turn lead to a drop in cooling power, and, under certain circumstances, to a failure of the compressors. This failure mode may be caused, at least in part, by the fact that the same amount of refrigerant exists in both the stationary and engine-running modes of operation. Because a smaller amount of refrigerant is typically required in stationary mode, due to the lower cooling needs, it may be necessary to take further appropriate measures to reduce the amount of refrigerant during stationary operation. This may be accomplished, for example, by drawing off a predetermined amount of refrigerant via a bypass (not shown) and temporarily storing this refrigerant in an accumulator (not shown) during stationary operation. After normal operation is resumed, the stored refrigerant may be pumped back into the refrigerant circuit.

Figure 2:
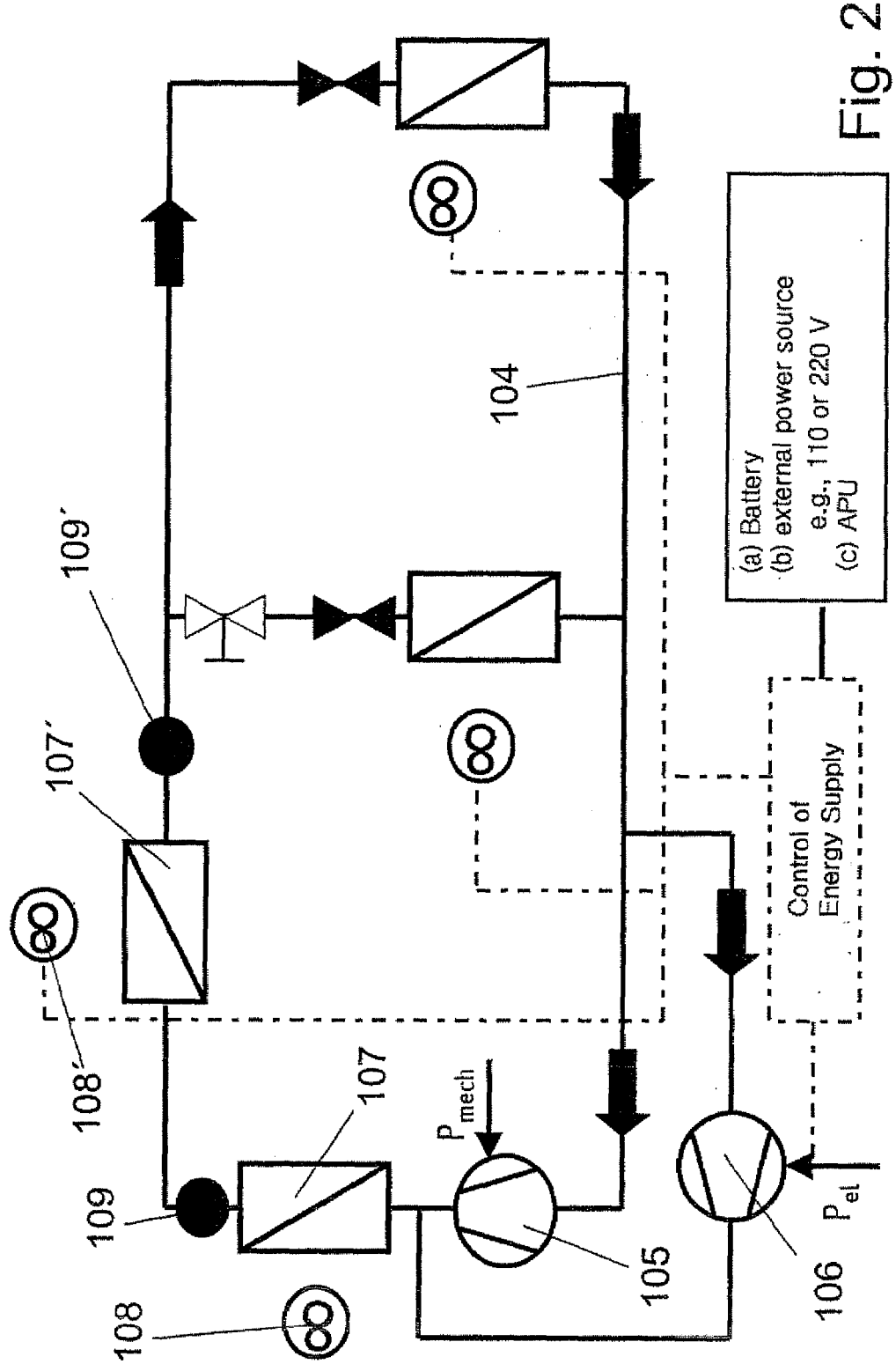
FIG. 2 is a simplified representation of a refrigerant circuit according to a second embodiment.

FIG. 2 illustrates an embodiment similar to FIG. 1. In this embodiment, refrigerant circuit 104 is constructed similarly to that of the first embodiment, so that identical and identically functioning components are provided with reference numbers increased from those of the first embodiment by 100. The parallel connection of the two compressors 105 and 106 corresponds to the previously described arrangement. A first condenser 107 is arranged downstream of the junction of the two compressors 105 and 106, and a mechanically driven fan 108 supplies an air stream to cool condenser 107. A first receiver 109 is coupled to the output of the first condenser 107. The embodiment of FIG. 2, however, differs from the embodiment of FIG. 1 in that a second condenser 107' is positioned downstream of the first condenser 107 and receiver 109. An electrically driven fan 108' supplies an air stream to transfer heat away from the second condenser 107' during the stationary operating mode of the vehicle. Second receiver 109' is suitably positioned downstream of second condenser 107'.

By providing two condensers 107, 107', each with a fan 108, 108', the cooling performance can be optimized. Receivers 109, 109' permit an optimized collection of excess refrigerant in the area where it accumulates in liquid form, and from where it can quickly be supplied back to the refrigerant circuit when needed.

Figure 3:
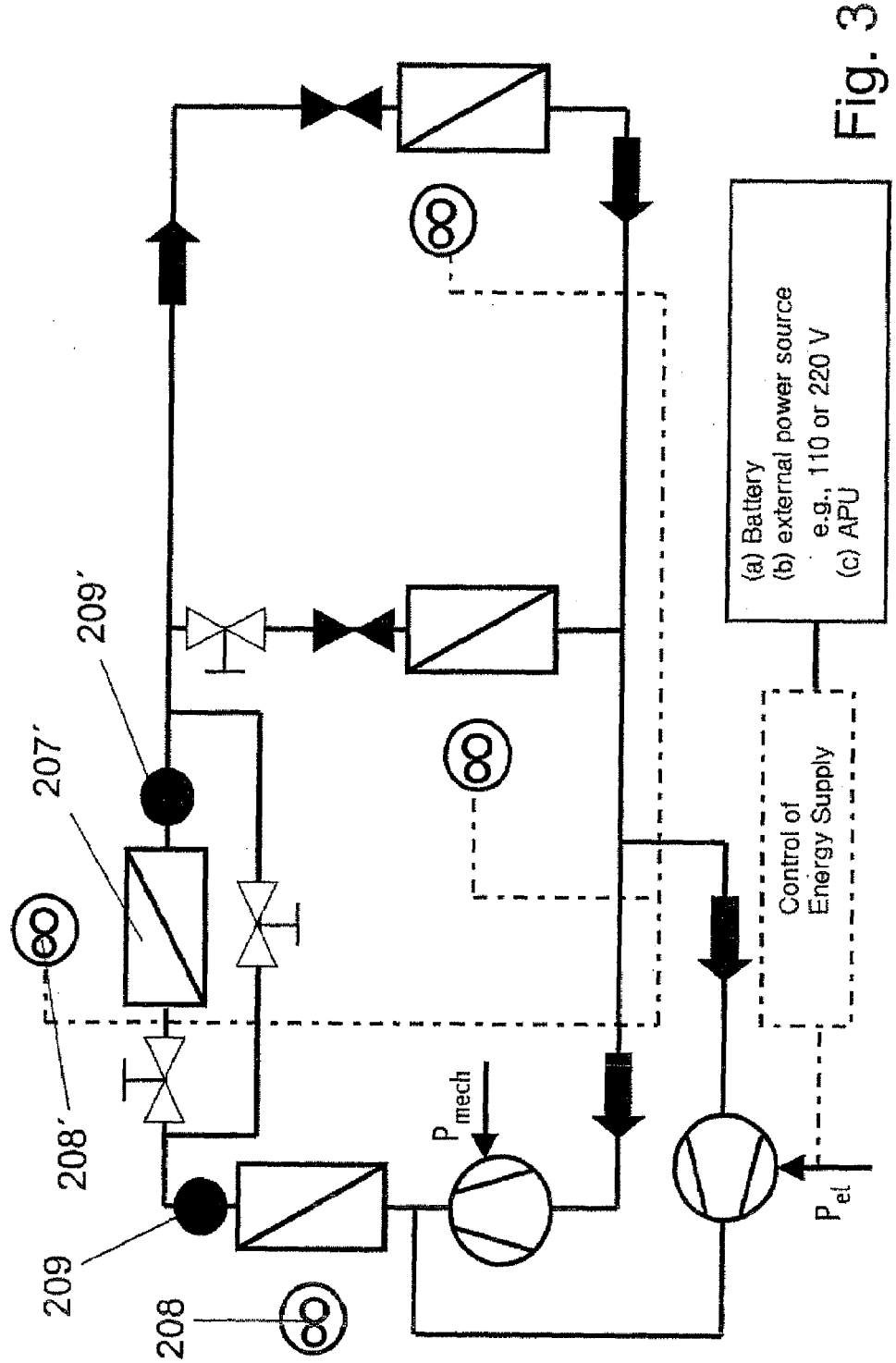
FIG. 3 is a simplified representation of a refrigerant circuit according to a third embodiment.

A third embodiment of the invention, which is illustrated in FIG. 3, overlaps with the previously described embodiments as will be appreciated by persons of skill in the art. Unlike the embodiment of FIG. 2, however, a bypass branch is provided downstream of a first condenser and receiver 209. In a normal operating mode, the valve upstream of second condenser 207' is closed and the valve in the bypass is open. The second condenser 207' is thus effectively removed from the refrigerant circuit due the diversion of refrigerant. When switched to a second operating mode, such as when the vehicle engine stops running, the valve upstream of second condenser 207' is opened and the other valve is closed, thereby closing the bypass and forcing refrigerant to flow through second condenser 207' and second receiver 209'. In this latter mode of operation, fan 208 is inactive, but second fan 208' supplies an air stream to condenser 207' for heat transfer purposes.

Figure 4:
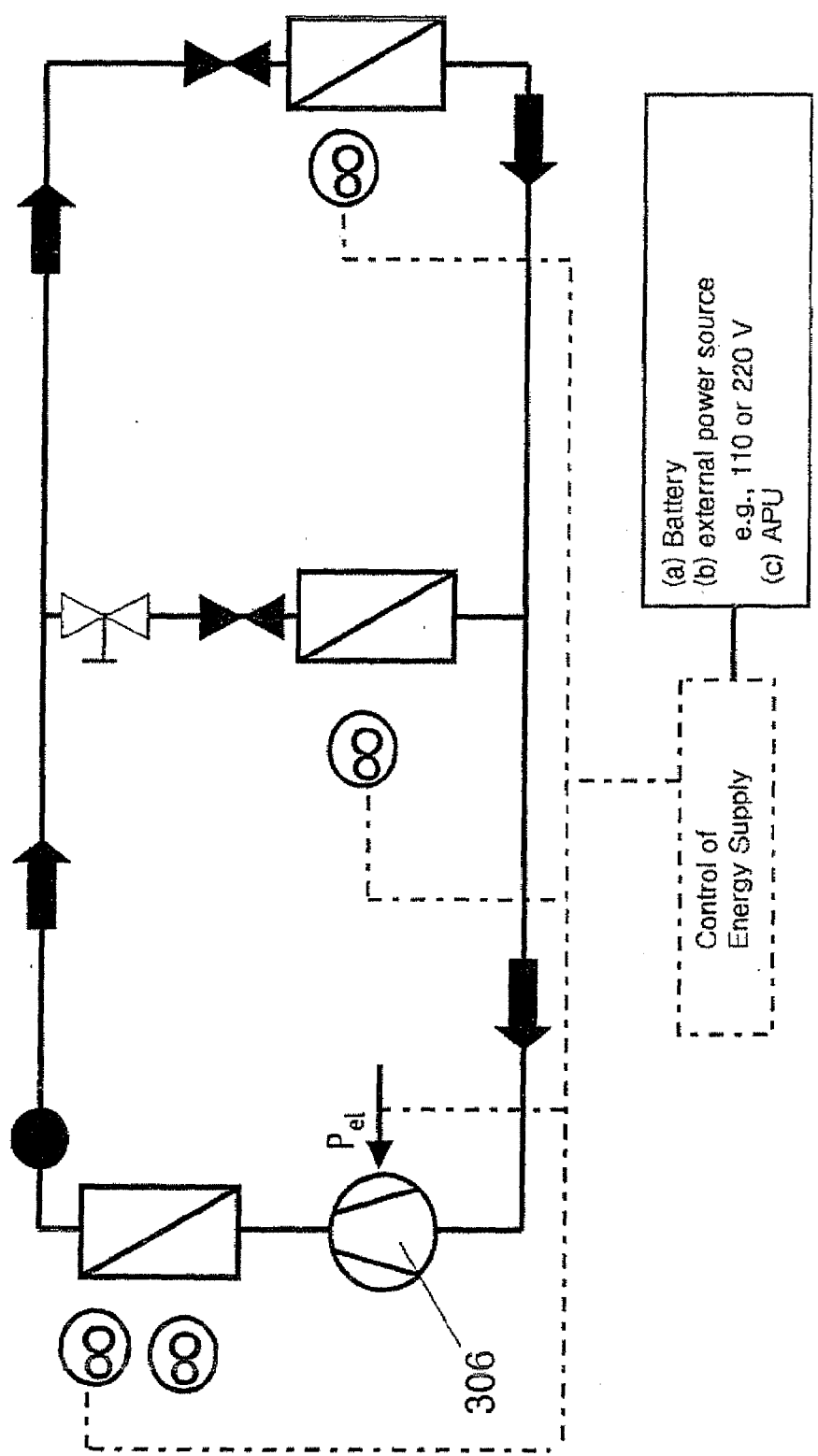
FIG. 4 is a simplified representation of a refrigerant circuit according to a fourth embodiment.
Figure 5:
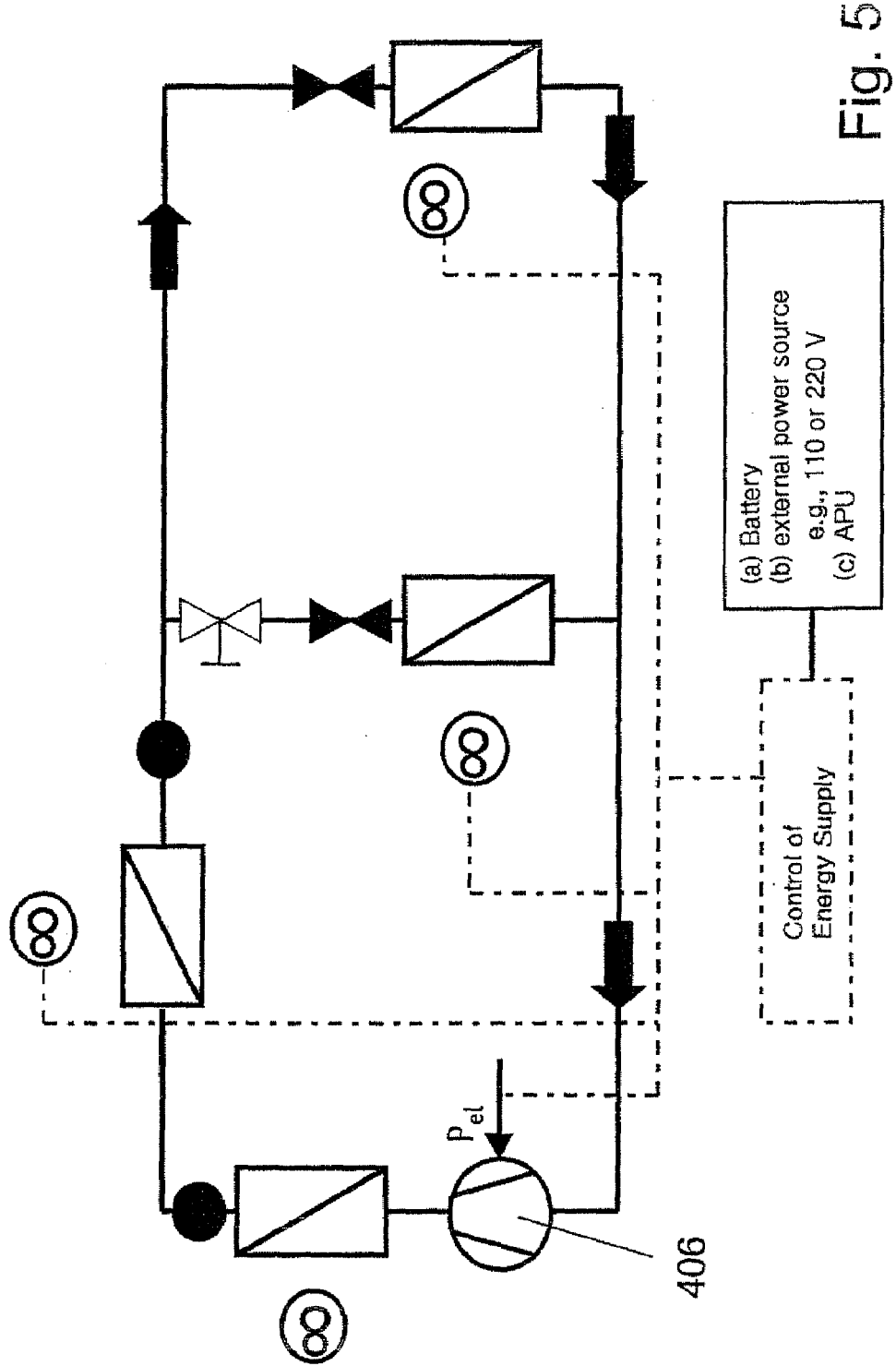
FIG. 5 is a simplified representation of a refrigerant circuit according to a fifth embodiment.
Figure 6:
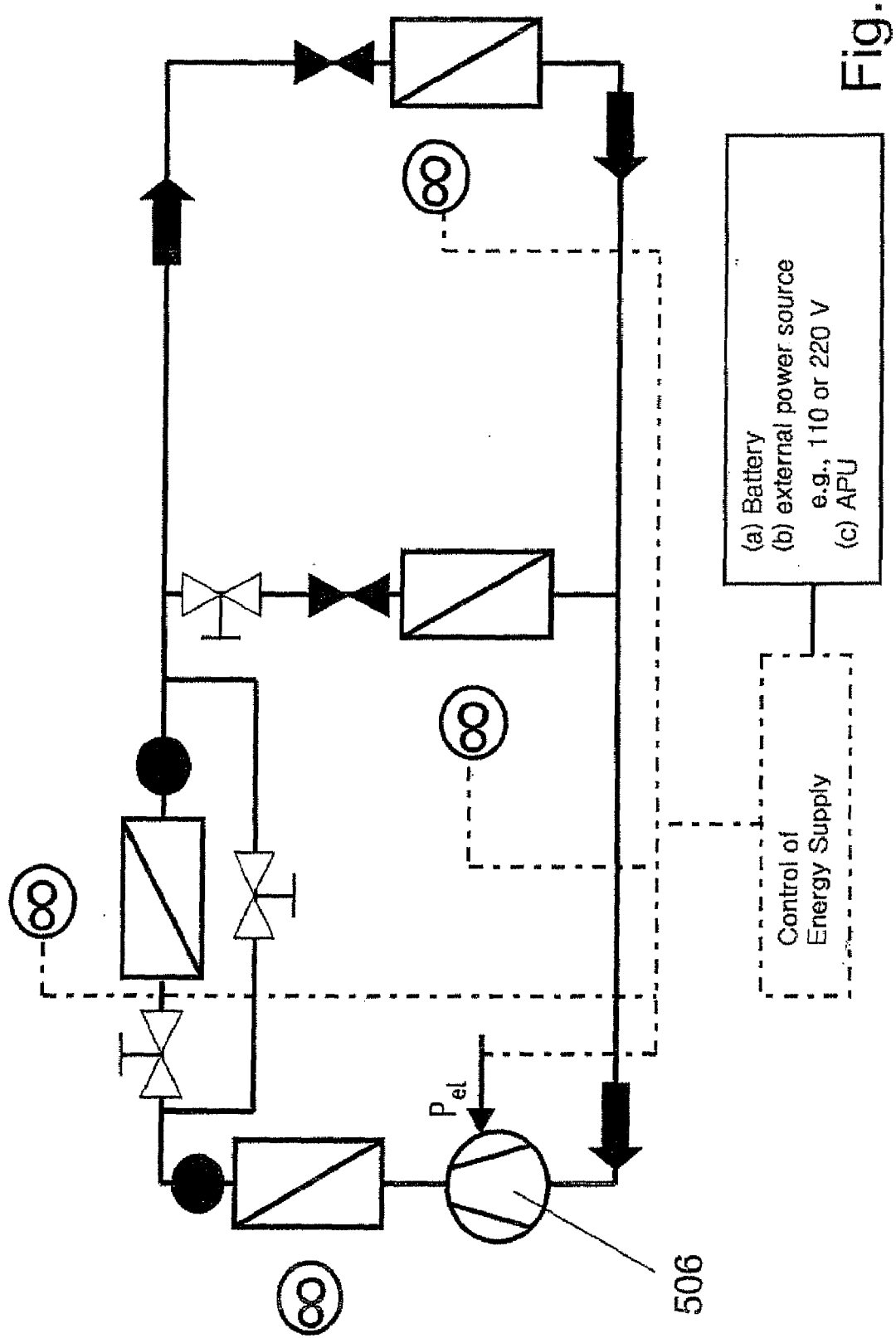
FIG. 6 is a simplified representation of a refrigerant circuit according to a sixth embodiment.

FIG. 4 illustrates a fourth embodiment of the invention. In this embodiment, a single electrically driven compressor 306 drives refrigerant through the refrigerant circuit. This embodiment is similar to the embodiment of FIG. 1, except that the single compressor 306 replaces the plurality of air compressors in FIG. 1. This single compressor circulates refrigerant as needed in both operating modes, normal and stationary. A fifth embodiment of the invention, as illustrated in FIG. 1, likewise replaces a plurality of different compressors with a single electrically-driven compressor 406. Except for this substitution, the embodiment of FIG. 5 substantially corresponds to the embodiment illustrated FIG. 2. In like manner, FIG. 6 substantially corresponds to the embodiment of FIG. 3 except for a single electrically-driven compressor 506 that circulates the refrigerant in both normal and stationary operation in place of a plurality of compressors of different drive types.

Figure 7:
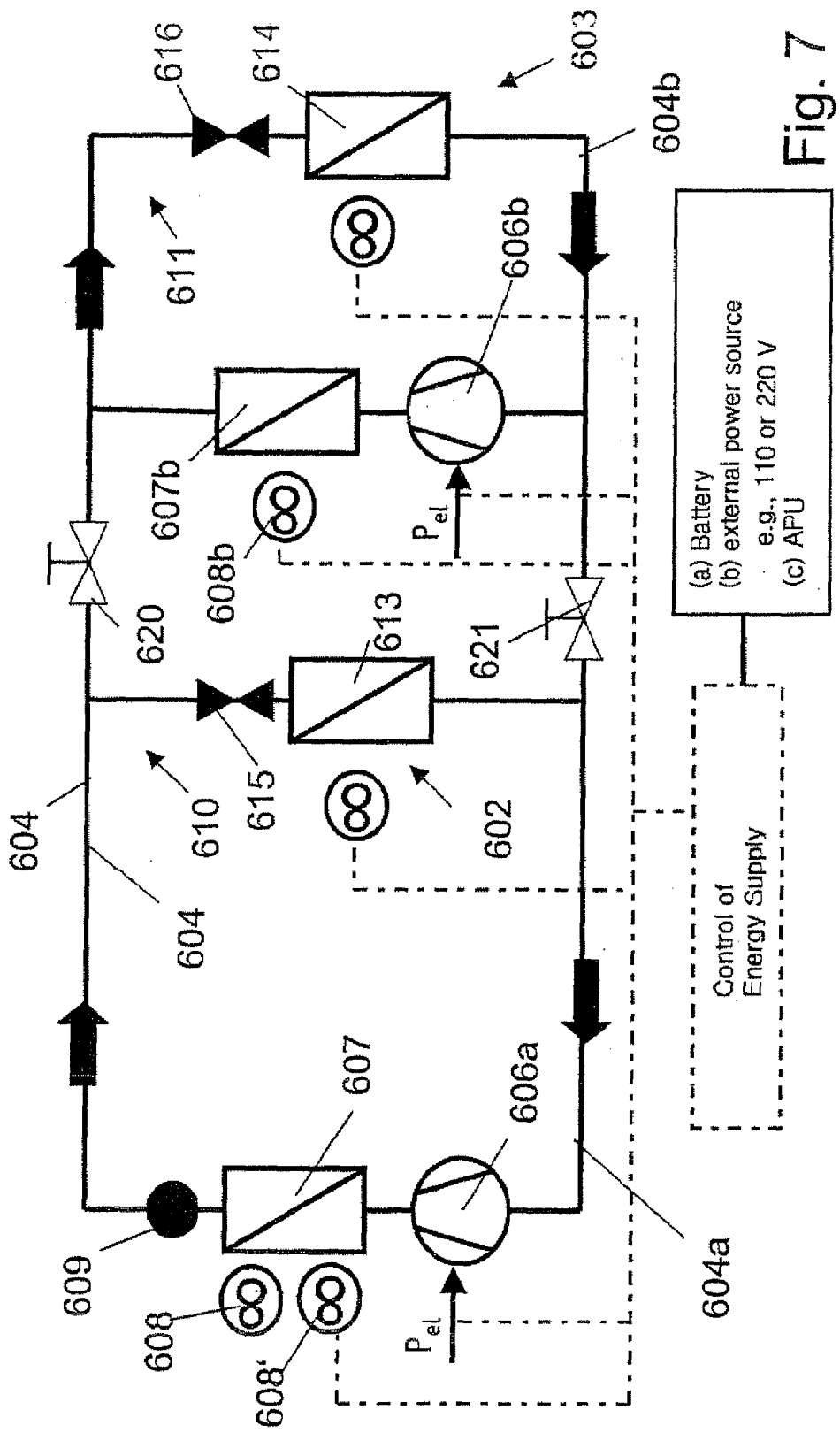
FIG. 7 is a simplified representation of a refrigerant circuit according to a seventh embodiment.

In a seventh embodiment of the invention, as illustrated in FIG. 7, the refrigerant circuit 604 can be selectively divided by means of valves 620, 621 into a refrigerant circuit 604a for front air conditioner 602 and a refrigerant circuit 604b for rear air conditioner 603. An electrical source provides power to electrically drivable compressors 606a and 606b. Condensers 607a, 607b are respectively arranged downstream of each compressor. The separation of the larger circuit 604 into two sub-circuits by means of the valves 620, 621 allows optimized cooling to fit the need, particularly in stationary operation.

In a first and normal operating mode, valves 620, 621 are opened, and compressor 606a circulates refrigerant through circuit 604. Appropriate sensors, switches and control logic (not shown) detect and select the position of valves 620, 621, as well as the operation of compressor 606b, which remains inactive in this mode of operation. Compressor 606a drives refrigerant through condenser 607, at which location a mechanically driven first fan 608 supplies an air stream. In this mode of operation, an electrically drivable second fan 608' is inactive, although as described above in connection with FIG. 1, this second electrically drivable fan 608' may be selectively operated even while the vehicle engine is running depending on demands placed on the cooling circuit. Refrigerant circuit 604 splits into two branches downstream of receiver 609. A portion of the refrigerant flows through branch 610 and the other portion through branch 611. An expansion member 615 is arranged in branch 610 upstream of an evaporator 613. Correspondingly, a second expansion member 616 is arranged in branch 611 upstream of a second evaporator 614. The two branches 610 and 611 are subsequently reunited so that the refrigerant again reaches compressor 606a.

In the embodiment of FIG. 7, and depending on user input or other cooling requirements, valves 620 and 621 may be closed during the first operating mode. In this arrangement, fan 608 continues to be mechanically driven by the running engine.

Continuing with the description of the embodiment of FIG. 7, valves 620 and 621 are preferably closed when the engine is shut off. In this second operating mode, two independent refrigerant sub-circuits 604a and 604b are formed. Electrically driven compressors 606a and 606b selectively circulate refrigerant through the respective sub-circuits of which they form a part.

In stationary operation, a first refrigerant sub-circuit 604a is associated with a "front" air conditioner 602. This sub-circuit corresponds to the circuit of normal operation, and is operated apart from the section of the circuit 604 assigned to rear air conditioner 603. An electrically driven fan 608' provides air flow through condenser 607 in place of mechanically driven fan 608. Downstream of condenser 607, the cooled refrigerant flows through receiver 609, expansion member 615, where it is further cooled as a consequence of the pressure drop, and evaporator 613, before it returns again to compressor 606a.

Refrigerant circuit 604b is also active in stationary operation. Electrically driven compressor 606b circulates refrigerant through condenser 607b, through which electric fan 608b directs an air stream. A receiver (not shown) may be placed downstream of condenser 607b. In addition, the cooled refrigerant flows through expansion member 616 and evaporator 614 before returning to compressor 606b.

Figure 8:
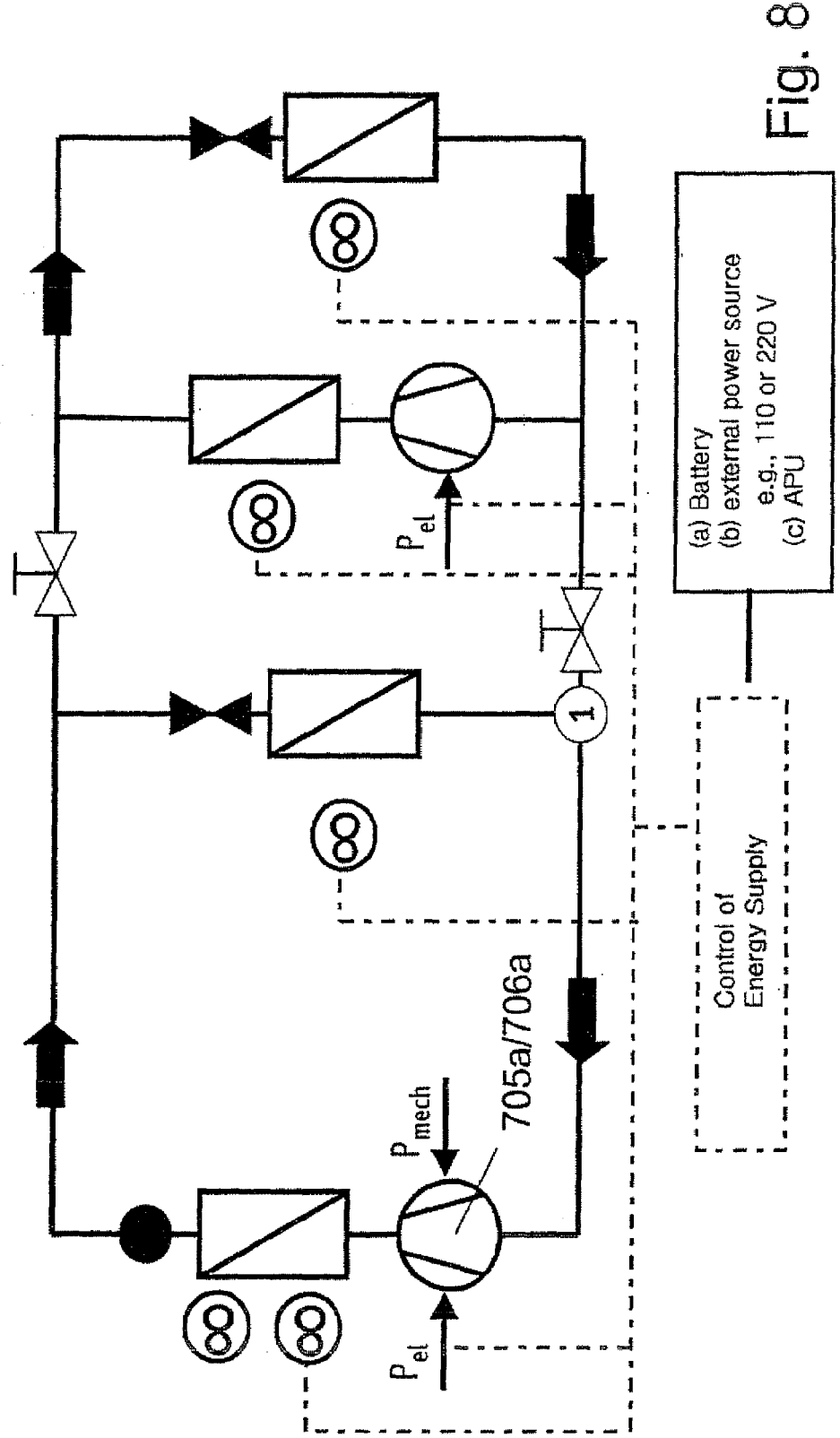
FIG. 8 is a simplified representation of a refrigerant circuit according to a eighth embodiment.

The eighth embodiment, as shown in FIG. 8, differs from the previously described seventh embodiment mainly in that, in place of electrically driven compressor 606a, a hybrid compressor 705a/706a. This compressor can be driven both electrically and mechanically through power supplied by the engine.

Figure 9:
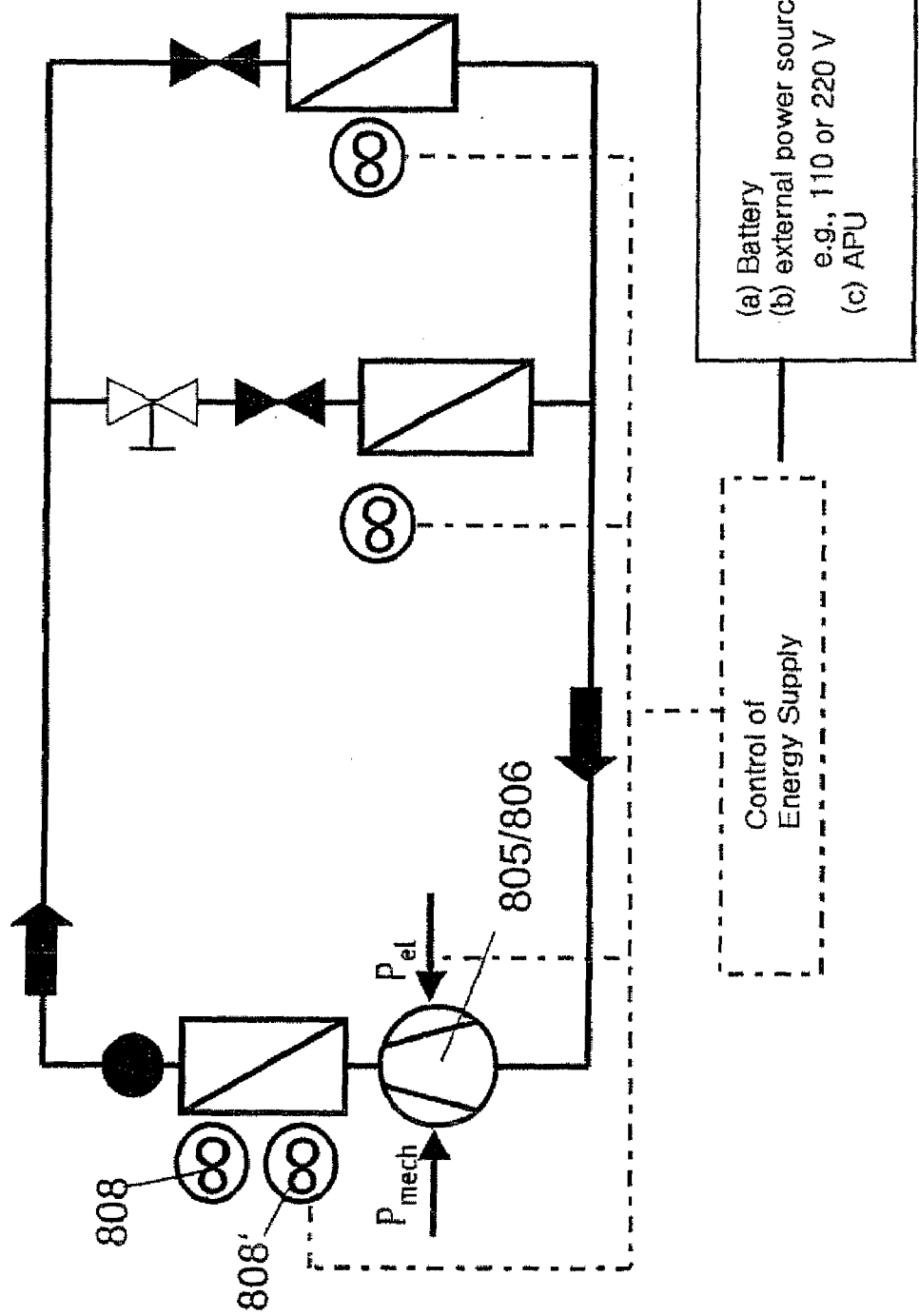
FIG. 9 is a simplified representation of a refrigerant circuit according to a ninth embodiment.
Figure 10:
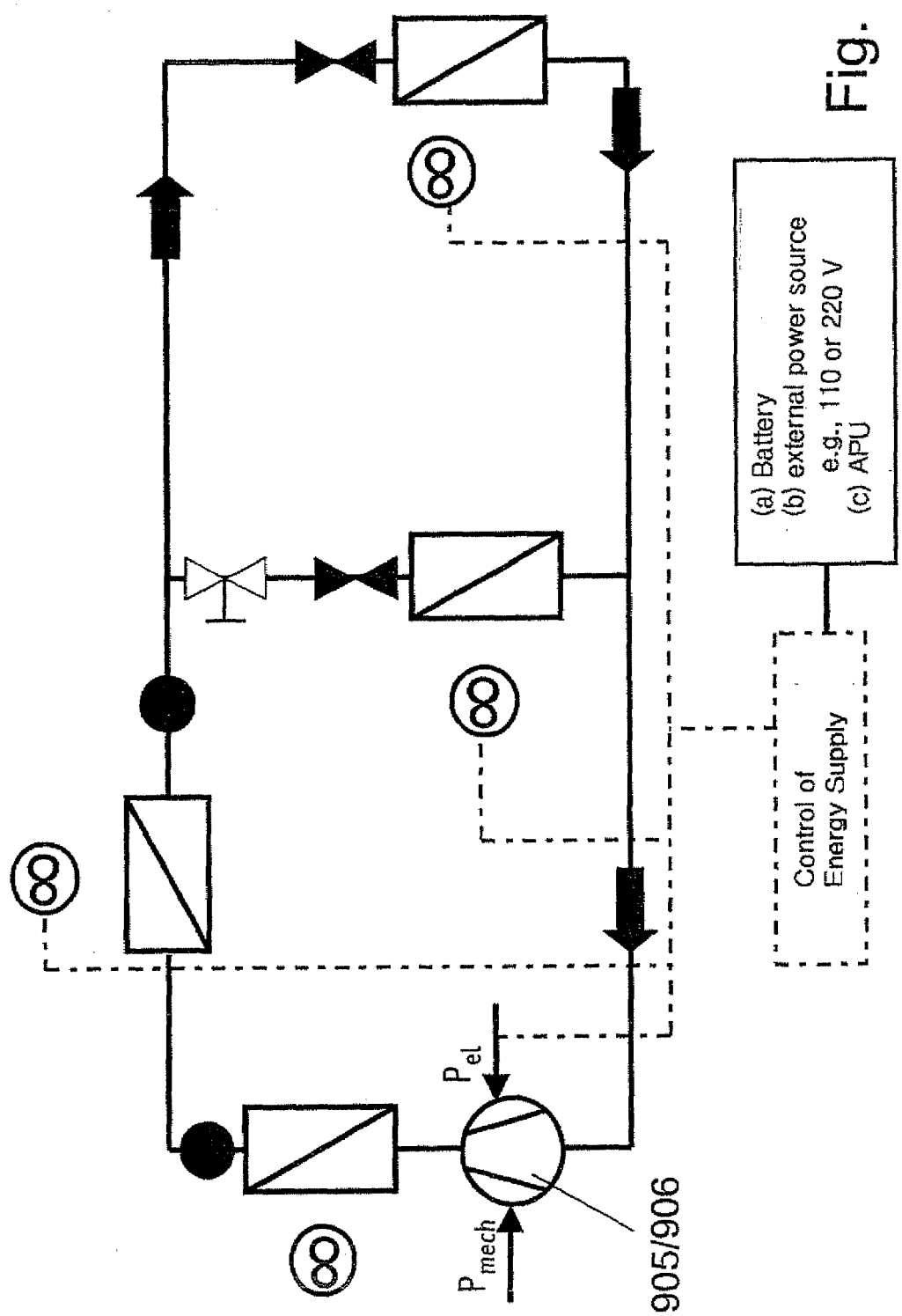
FIG. 10 is a simplified representation of a refrigerant circuit according to a tenth embodiment.
Figure 11:
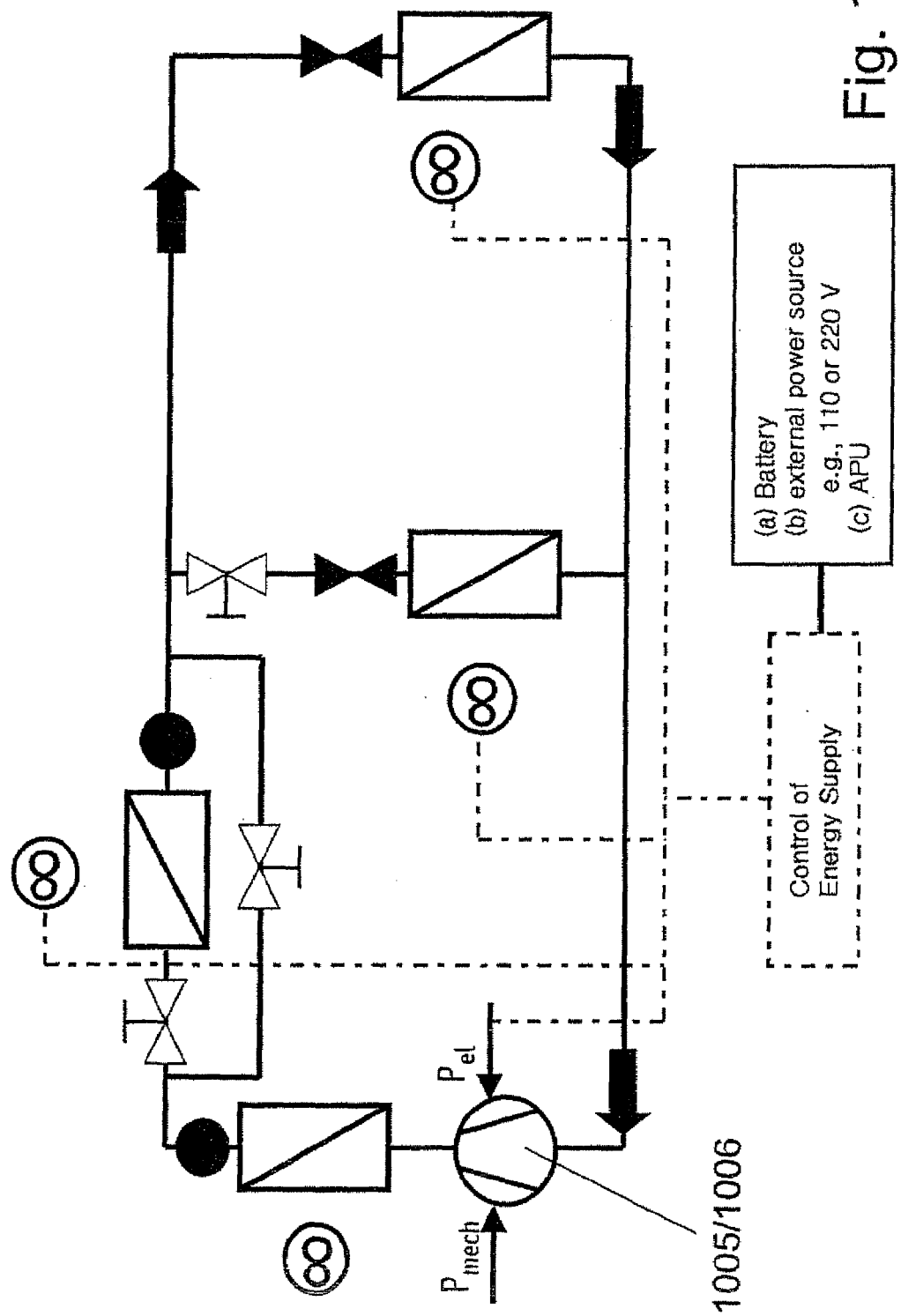
FIG. 11 is a simplified representation of a refrigerant circuit according to a eleventh embodiment.

FIG. 9 illustrates a ninth embodiment. This embodiment shares common characteristics of the embodiments of FIGS. 1 and 4. In contrast to the electrical compressor of FIG. 4, and in place of two compressors 5 and 6 arranged in parallel in FIG. 1, a single hybrid compressor 805/806 circulates coolant through the refrigerant circuit. A vehicle engine drives hybrid compressor 805/806 in normal operation, and electrical energy drives this compressor in stationary operation. Actuation of fans 808 and 808' occurs in a manner as described in the foregoing embodiments. FIG. 10 likewise illustrates an alternative embodiment of the invention in which a hybrid compressor 905/906 corresponds to the electrical compressor in the embodiment of FIG. 5 and the two compressors arranged in parallel in the embodiment of FIG. 2. Also in like manner, FIG. 11 illustrates an alternative embodiment of the invention in which a hybrid compressor 1005/1006 corresponds to the electrical compressor in the embodiment of FIG. 6 and the two compressors arranged in parallel in the embodiment of FIG. 3. As with prior embodiments, the electrical compressor illustrated in the embodiment of FIG. 12 may be operated intermittently rather than continuously depending on the cooling demands placed upon the circuit.

As an alternative to the previously-described embodiments, a refrigerant receiver with variable capacity is deployed in the refrigerant circuit. It is also possible to integrate an expansion member into a receiver and to add a drier unit, so that corresponding combinations are provided in place of the two expansion members of the first embodiment. As yet an additional alternative, a bypass with an ice accumulator may be located in the refrigerant circuit, into which bypass the excess (cold) refrigerant is directed, the brine is cooled, and the refrigerant remains in this bypass during stationary operation. In some or all of the foregoing embodiments and alternatives to such embodiments, at least a portion of an condenser that is inactive during stationary operation can serve for interim storage of the excess refrigerant. Likewise, in some or all of the foregoing embodiments and alternative embodiments, a hybrid drive unit can be provided for one fan, which replaces the two fans for the previously described embodiments in which two differently drivable fans are provided at one condenser.

Figure 12:
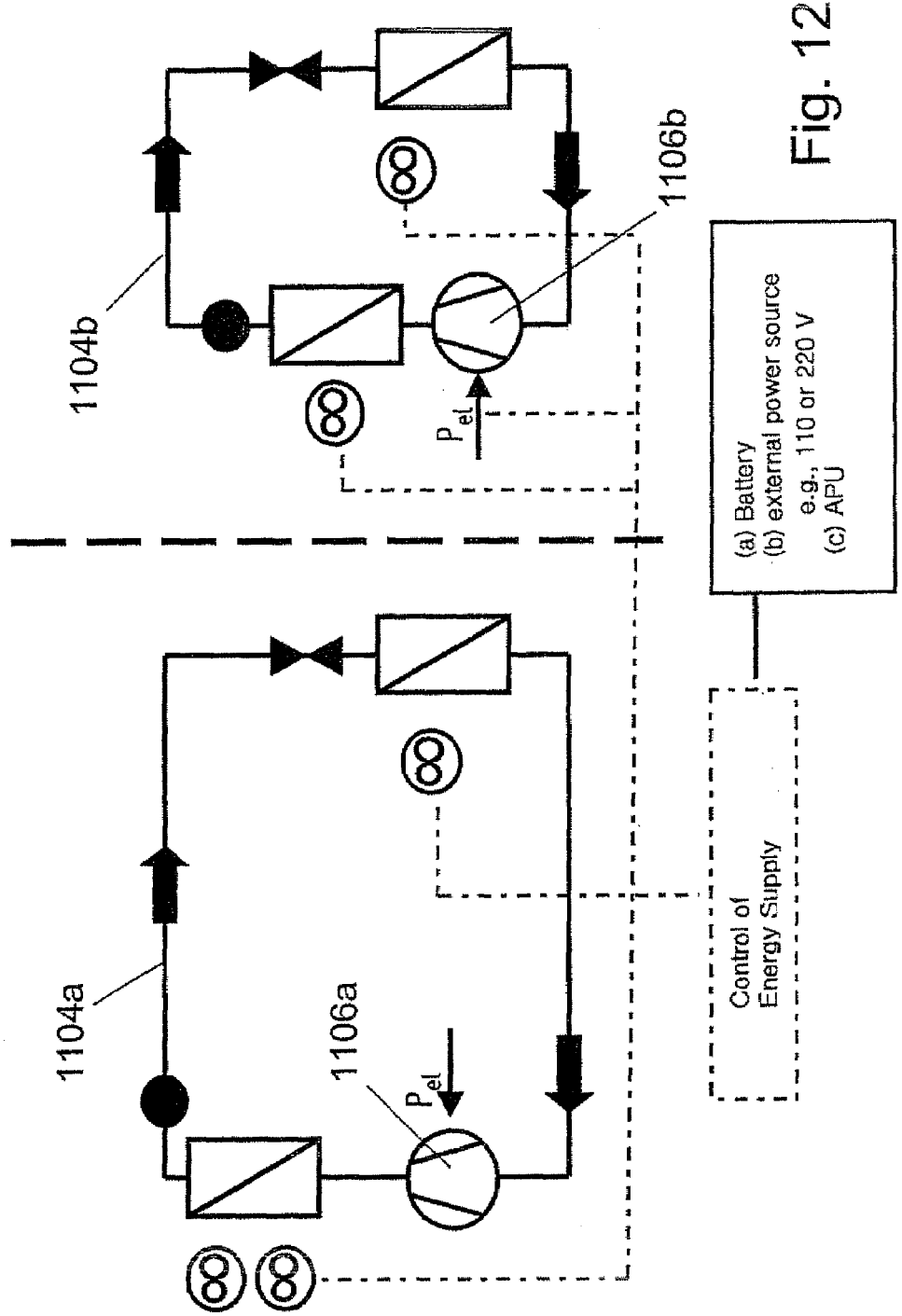
FIG. 12 is a simplified representation of a refrigerant circuit according to a twelfth embodiment.

FIG. 12 illustrates a twelfth embodiment of the invention, which is conceptually similar to the embodiment illustrated in FIG. 7. In this embodiment, two completely separate refrigerant circuits 1104a and 1104b circulate refrigerant to various components through two separate branches. In this manner, the embodiment of FIG. 12 acts in a manner similar to the embodiment of FIG. 7 when valves 620 and 621 are closed. According to the twelfth embodiment, however, two compressors 1106a and 1106b are electrically driven in both normal operation and in stationary operation.

Figure 13:
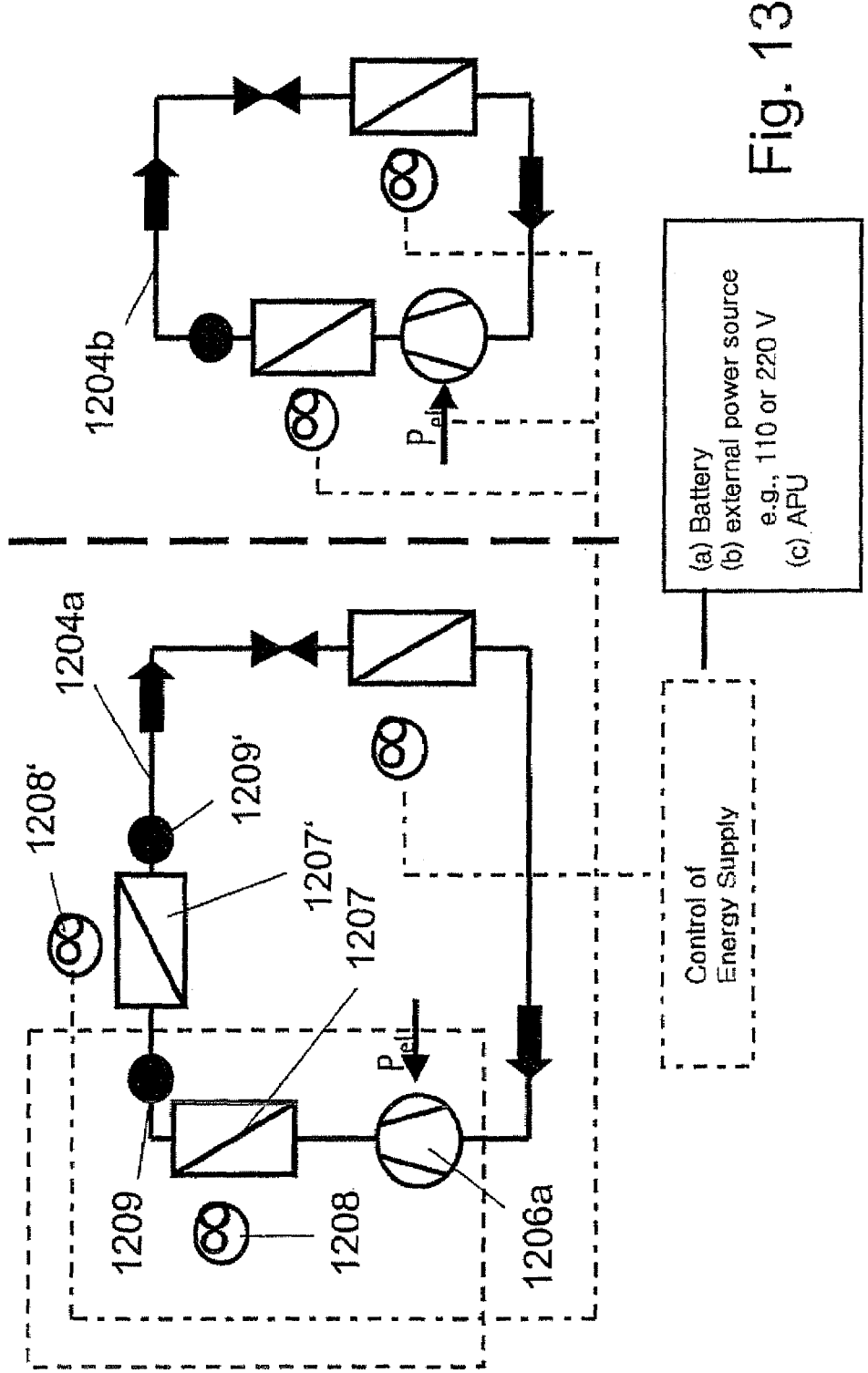
FIG. 13 is a simplified representation of a refrigerant circuit according to a thirteenth embodiment.

The embodiment of FIG. 13 substantially corresponds to the embodiment FIG. 12, except that a first refrigerant circuit includes a second condenser 1207' and a second receiver 1209' arranged downstream of electrically driven compressor 1206a, first condenser 1207 and first receiver 1209. In this embodiment, each condenser is preferably provided with a fan. As illustrated in FIG. 13, a mechanical first fan 1208, driven by the vehicle's engine during normal operation, provides an air stream to first condenser 1207, and a second, electrically drivable fan 1208' provides an air stream to second condenser 1207' when the vehicle is in stationary operation. Second refrigerant circuit 1204b generally corresponds to refrigerant circuit 1104b.

Figure 14:
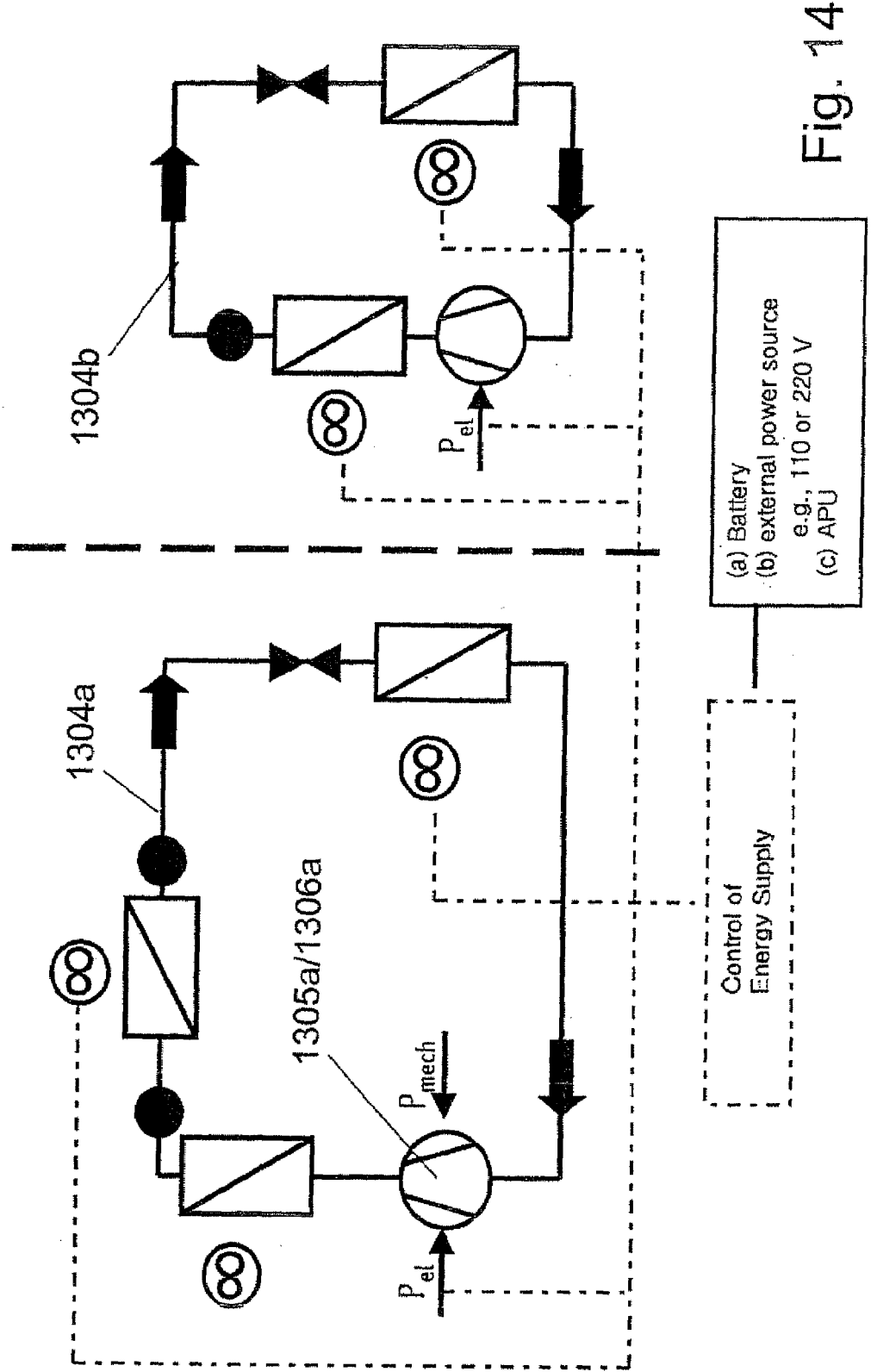
FIG. 14 is a simplified representation of a refrigerant circuit according to a fourteenth embodiment.

FIG. 14 illustrates a fourteenth embodiment that substantially corresponds to the previously described thirteenth embodiment. In place of the single electrically driven compressor 1206a in the first refrigerant sub-circuit, however, the embodiment of FIG. 14 deploys a hybrid compressor 1305a/1306a. Second refrigerant circuit 1304b corresponds to refrigerant circuit 1104b of the twelfth embodiment.

A fifteenth embodiment of the invention includes a bypass sub-circuit that permits refrigerant to flow around a first condenser. In this regard, the embodiment of FIG. 15 corresponds to the embodiment of FIG. 3 except for the bypass circuit around a first condenser 1407. A mechanically driven fan 1408 supplies air to the first condenser in a first vehicle operation, and is inactive during a second. Likewise, with the assistance of associated sensors, switches and control logic, the bypass valves open and close depending on the operating mode of the vehicle. In normal operation, the first valve is closed and the second is open, so that refrigerant flows through the second branch and thus through condenser 1407.

In contrast to the third embodiment, however, no bypass is provided around second condenser 1407'. Furthermore, receiver 1409 is arranged only downstream of second condenser 1407', which is cooled via electrically driven fan 1408'. In this embodiment, the first receiver 209 of the third embodiment is completely absent.

A normal operating mode, i.e., operation with the engine running, may be described by reference to FIG. 15. First compressor 1405 circulates refrigerant through a first condenser 1407 that is cooled by air from fan 1408. With an open second valve and a closed first valve, the air is conveyed through condenser 1407 by a first fan 1408 driven by the vehicle engine. Cooling also takes place due to relative wind or air flow due to movement of the vehicle. Cooled refrigerant subsequently flows through second condenser 1407', which is selectively cooled with electrically driven fan 1408', and, subsequently, through receiver 1409.

In a stationary operating mode, i.e., with the vehicle's engine not running, the circulation of the refrigerant is accomplished exclusively by the second, electrically driven compressor 1406, which, based on valve settings, causes refrigerant to flow through the bypass of first condenser 1407. In this arrangement of components, a first fan 1408 is inactive due to the inactive engine. Refrigerant thereafter flows through second condenser 1407' in which the refrigerant is cooled, since second fan 1408' is now selectively driven with the aid of the electric power supply. Excess liquid refrigerant can accumulate in downstream receiver 1409. As previously described, the refrigerant flows through two branches 10 and 11 and thereafter returns to the second compressor 1406, due to the first compressor 1405 being inactive.

Figure 15:
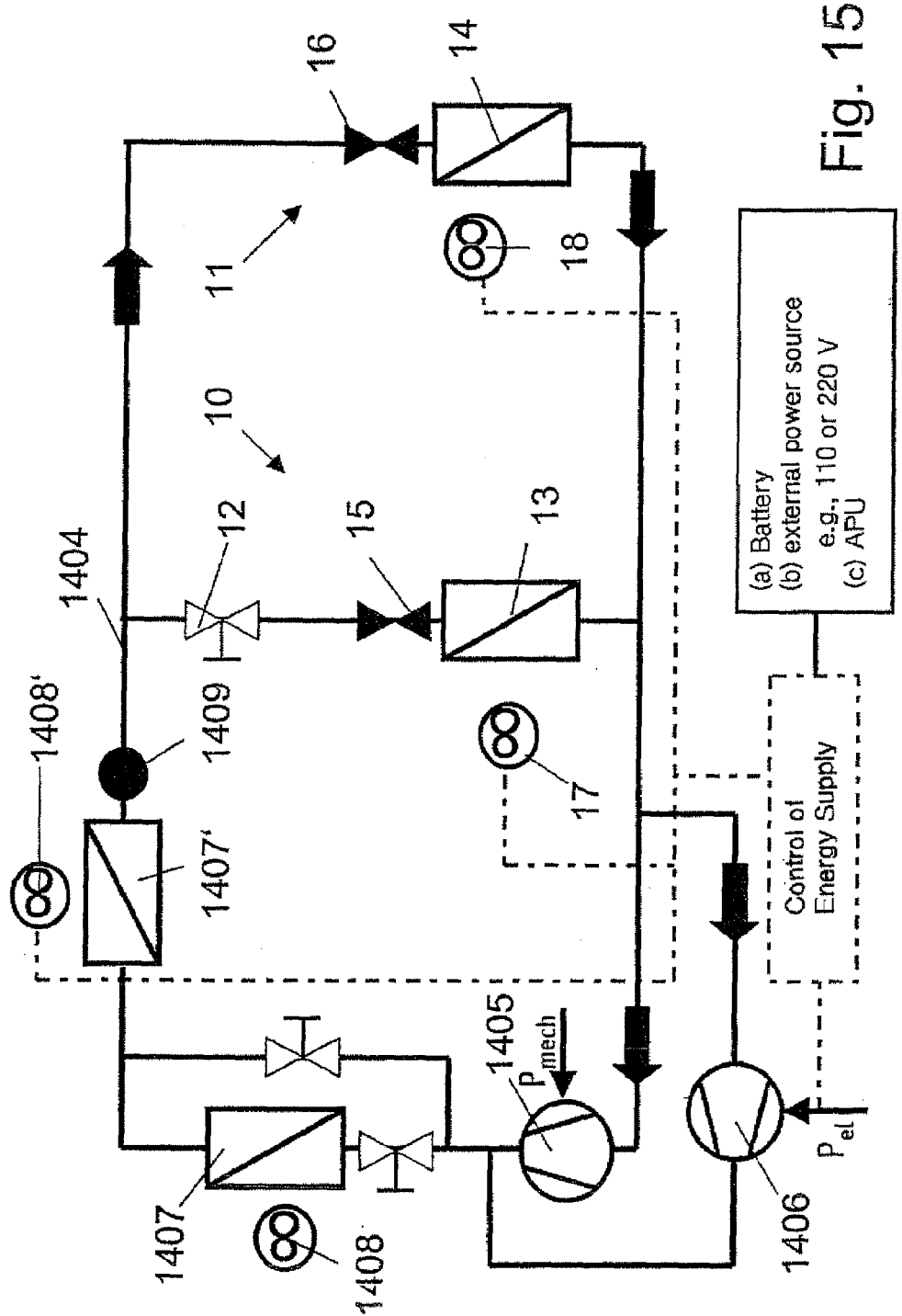
FIG. 15 is a simplified representation of a refrigerant circuit according to a fifteenth embodiment.
Figure 16:
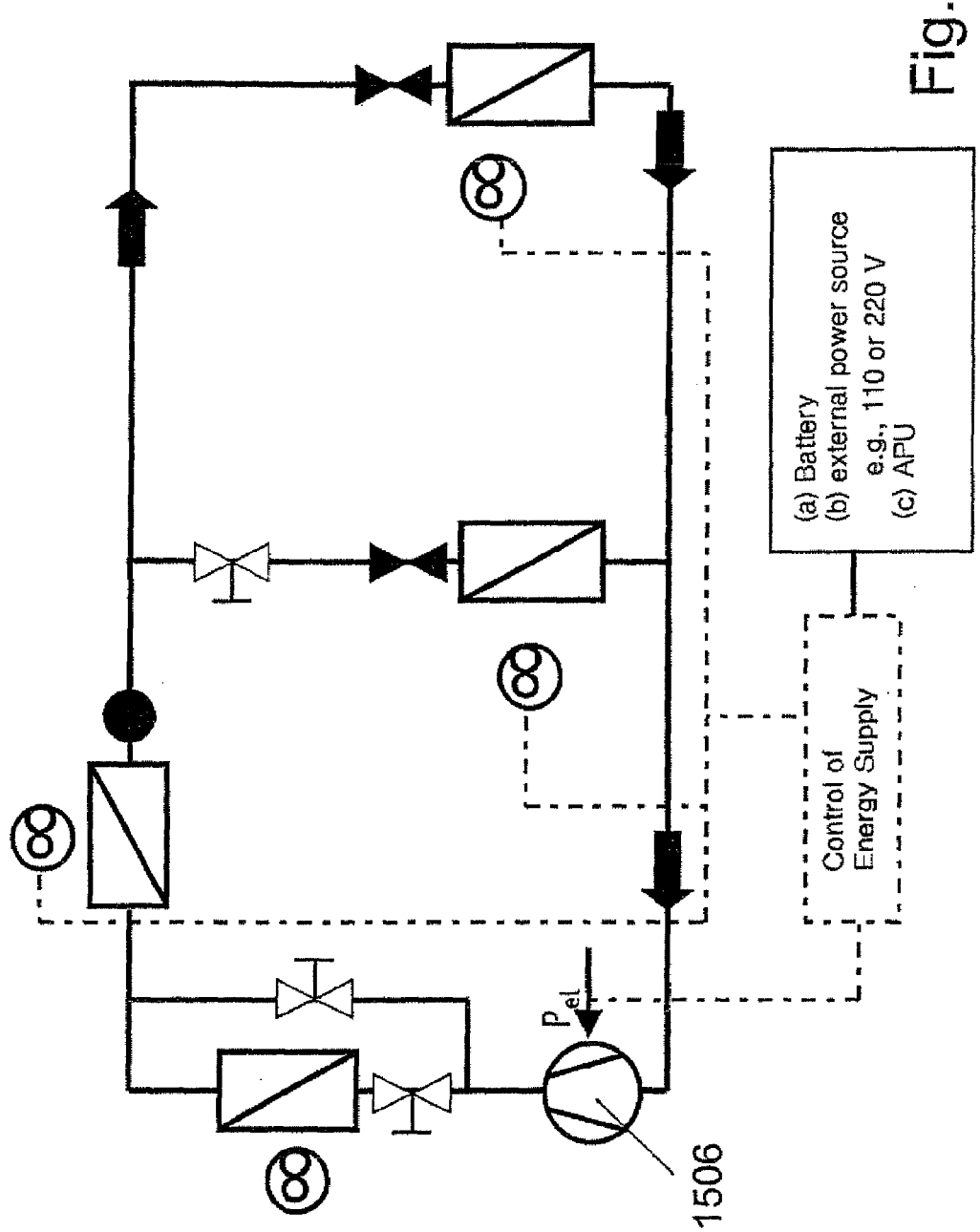
FIG. 16 is a simplified representation of a refrigerant circuit according to a sixteenth embodiment.
Figure 17:
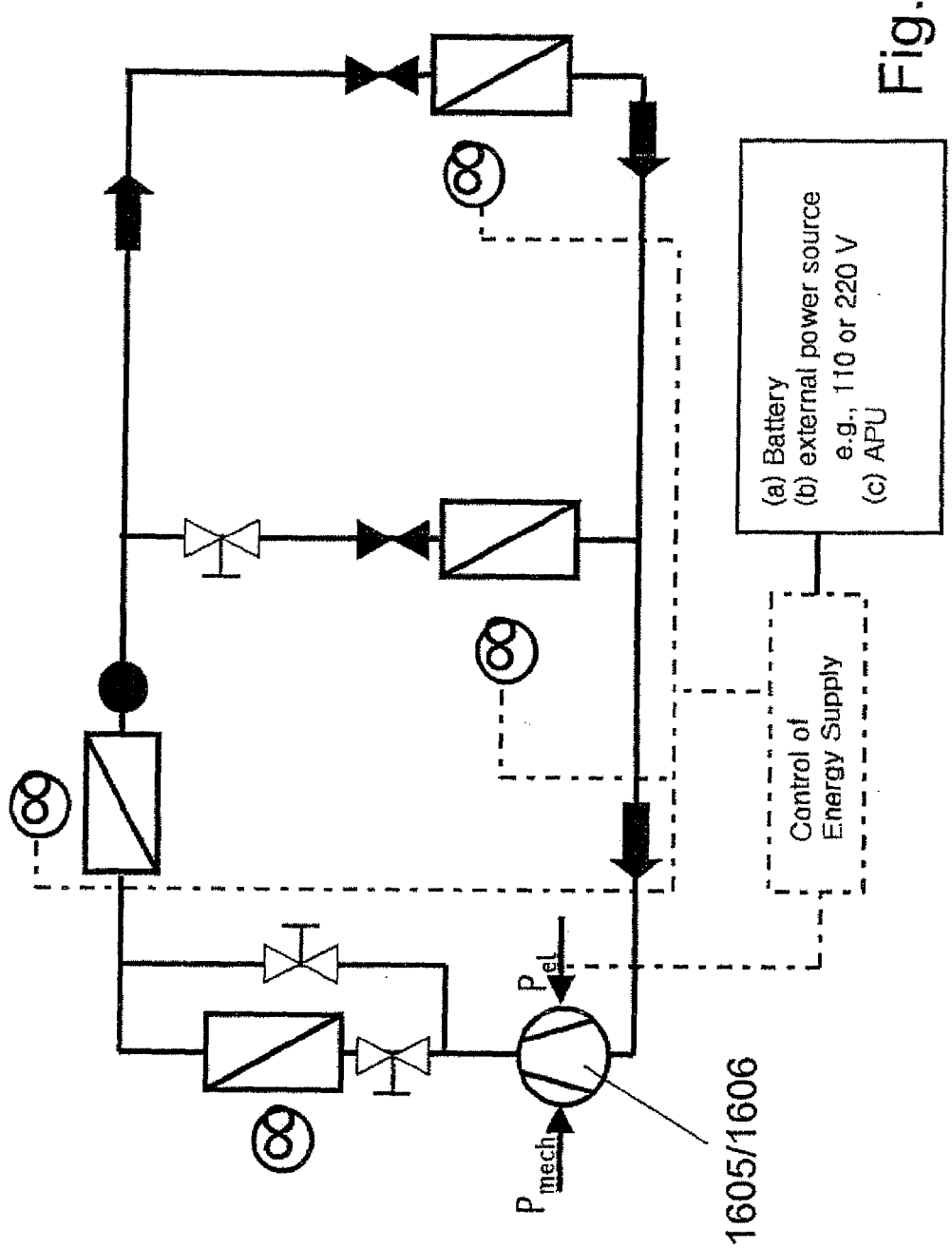
FIG. 17 is a simplified representation of a refrigerant circuit according to a seventeenth embodiment.

The embodiments illustrated in FIGS. 16 and 17 are similar to the embodiment of FIG. 15 except for the primary compressor. In the embodiment of FIG. 16, only one electrically driven compressor 1506 circulates refrigerant both in normal operation and as needed in stationary operation. For the seventeenth embodiment as illustrated in FIG. 17, a hybrid compressor 1605/1606, which can be driven both mechanically by the engine and electrically, causes refrigerant to flow through the various circuits.

Figure 18:
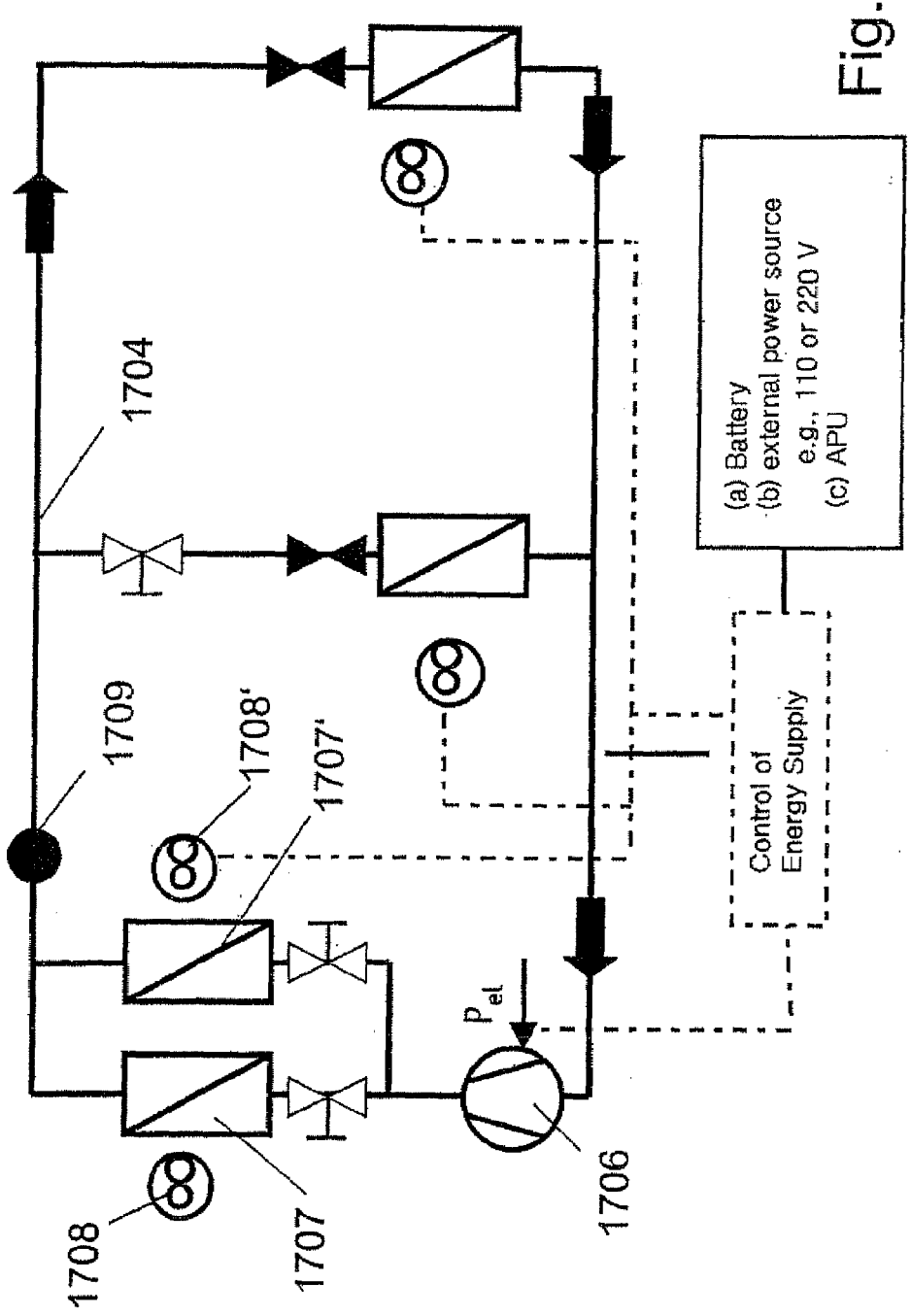
FIG. 18 is a simplified representation of a refrigerant circuit according to a eighteenth embodiment.

FIG. 18 illustrates yet another possible embodiment of the invention. In this embodiment, an electrically-driven compressor 1706 supplies refrigerant to a plurality of downstream condensers 1707 and 1707' arranged in a parallel configuration. The two condensers 1707 and 1707' are associated with a pair of fans, the first of which, indicated by reference numeral 1708, is mechanically driven by the vehicle's engine and the second fan 1708' is driven by electrical power. Appropriate sensors, switches and control logic determines the state of a pair of valves arranged upstream of condensers, which in turn control the flow of refrigerant through an appropriate condenser/fan combination, and a receiver 1709 situated downstream of the junction of the parallel branches receives refrigerant from the active condenser.

In normal operation, electrical compressor 1706 circulates refrigerant, and, because of the open first valve and the closed second valve, it flows through the first branch in which a first condenser 1707 is arranged. Fan 1708, driven by the running engine, conveys air through this condenser, whereas electrically drivable fan 1708' at second condenser 1707' is inactive. The refrigerant subsequently flows through receiver 1709.

In stationary operation, i.e., with an inactive engine, the first valve is closed and the second valve is open, which in turn causes refrigerant to flow through only second condenser 1707'. In this case, electrically driven fan 1708' conveys air to flow through the second condenser, whereas mechanically drivable first fan 1708 is inactive. As in normal operation, the refrigerant subsequently flows through receiver 1709.

Figure 19:
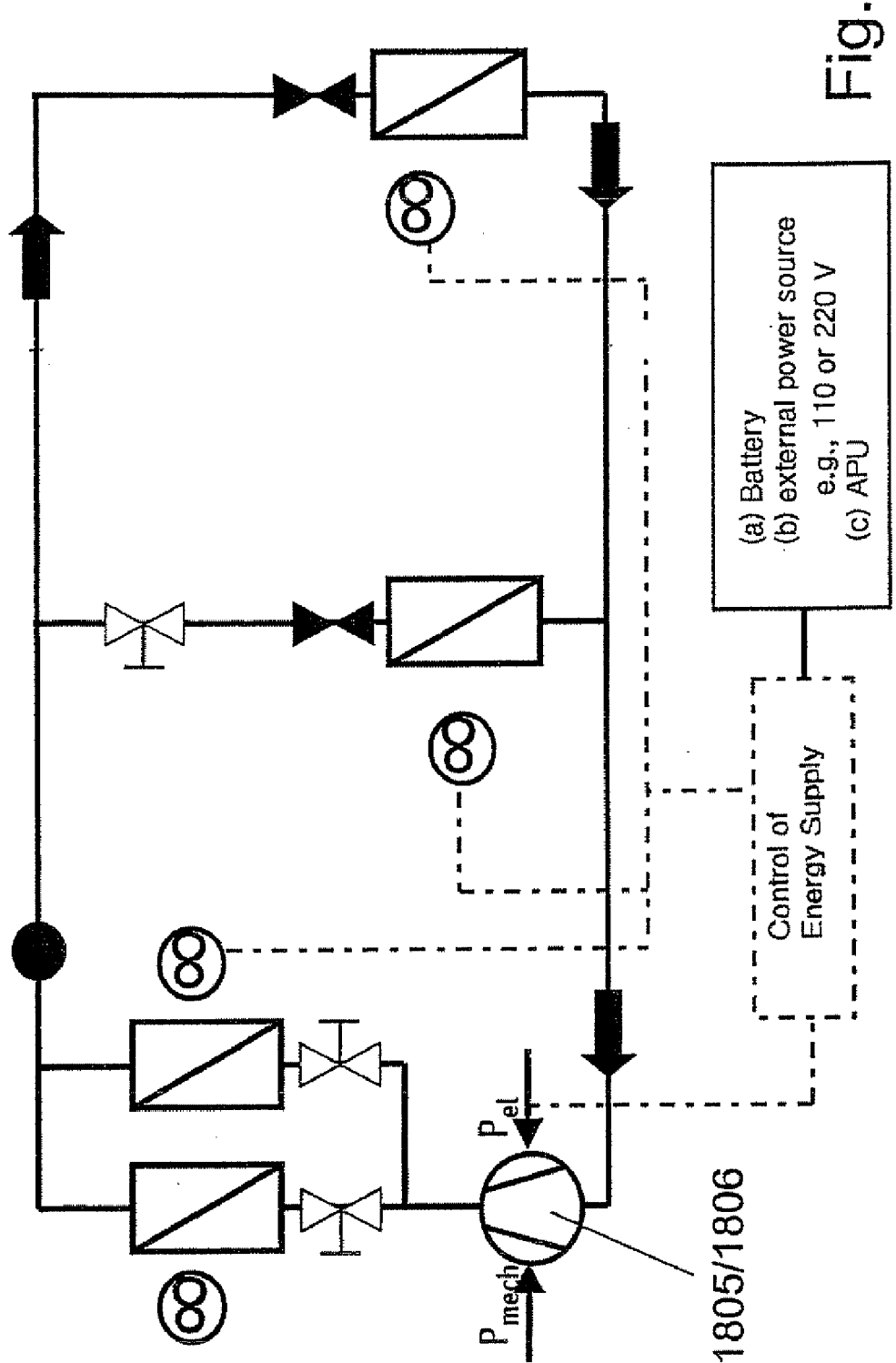
FIG. 19 is a simplified representation of a refrigerant circuit according to a nineteenth embodiment.
Figure 20:
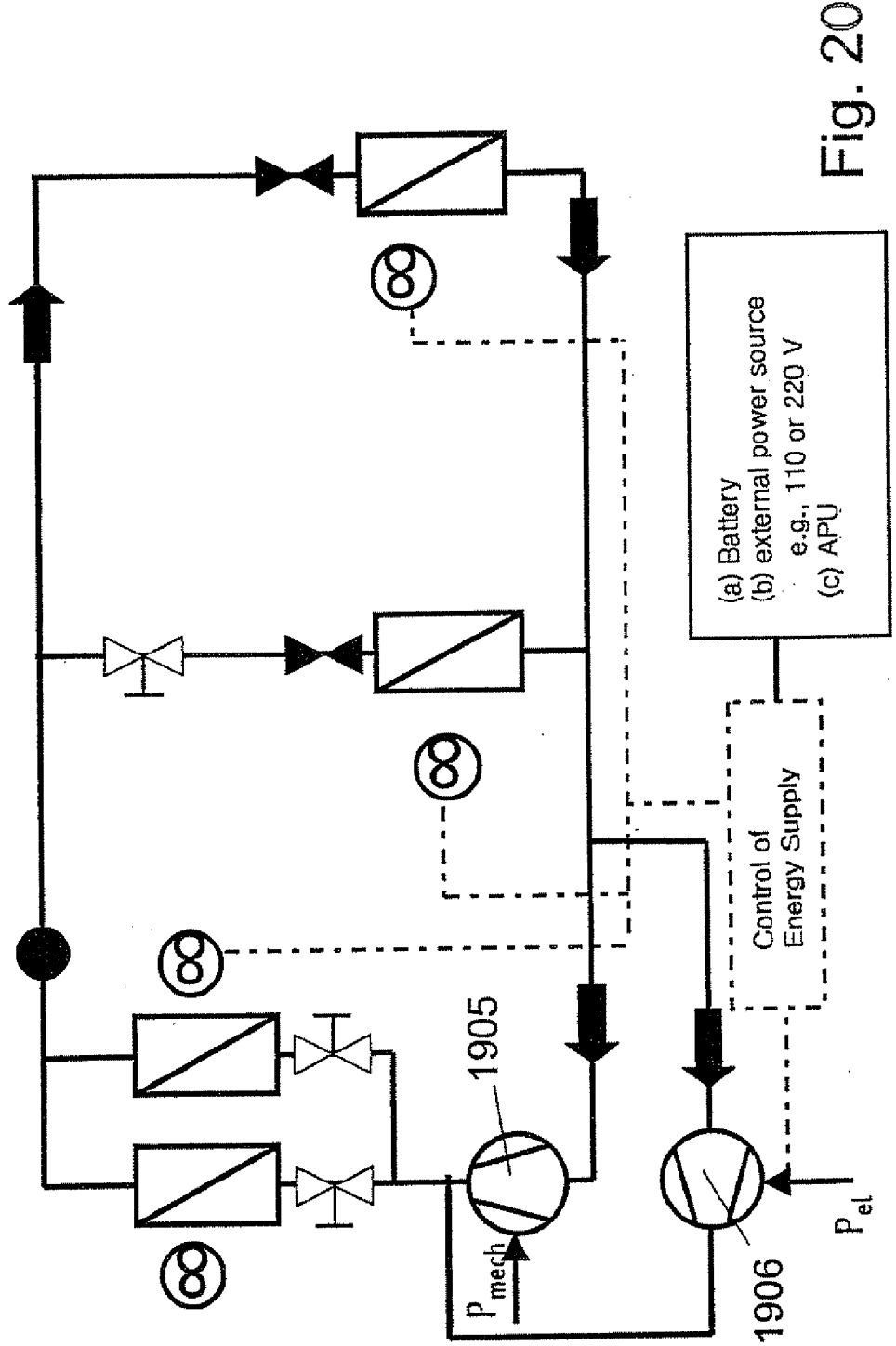
FIG. 20 is a simplified representation of a refrigerant circuit according to a twentieth embodiment.

FIGS. 19 and 20 illustrate nineteenth and twentieth embodiments, respectively, of the invention. These embodiments are similar in operation to the embodiment illustrated in FIG. 18. In the embodiment of FIG. 19, a hybrid compressor 1805/1806, which is driven by the running engine in normal operation and electrically in stationary operation, is provided in place of electrical compressor 1706 of the eighteenth embodiment. Likewise, in the embodiment of FIG. 20, a parallel connection of a mechanical compressor 1905 and an electrical compressor 1906, as in the first and third embodiments, is provided in place of electrical compressor 1706 of the eighteenth embodiment.

While this invention has been described with an emphasis upon particular embodiments, it should be understood that the foregoing description has been limited to the presently contemplated best modes for practicing the invention. It will be apparent that further modifications may be made to the invention, and that some or all of the advantages of the invention may be obtained. Also, the invention is not intended to require each of the above-described features and aspects or combinations thereof. In many instances, certain features and aspects are not essential for practicing other features and aspects. The invention should only be limited by the appended claims and equivalents thereof, since the claims are intended to cover other variations and modifications even though not within their literal scope.

What is claimed is:

1. An air conditioning system for use in a vehicle and having air conditioning elements positioned within a refrigeration circuit, the air conditioning system comprising a selectively operable first compressor, a first condenser positioned downstream of the first compressor, a plurality of fans positioned to pass air through the first condenser, wherein a first fan is selectively powered by a mechanical source and a second fan is selectively powered by an electrical source, and an additional compressor;

wherein the air conditioning system operates in a first operating mode when a mechanically linked vehicle engine is running and a second operating mode when the engine is stopped; and, wherein the refrigerant circuit includes two independent refrigerant sub-circuits with the first compressor arranged in one independent refrigerant sub-circuit, and the additional compressor arranged in the other independent refrigerant sub-circuit.

2. The air conditioning system of claim 1, wherein the mechanical source of power is supplied by a vehicle's engine.

3. The air conditioning system of claim 1, wherein the first fan includes a hybrid drive unit that is powered by a mechanical source of power in the first operating mode and by an electrical power source in the second operating mode.

4. The air conditioning system of claim 1, wherein the first fan selectively supplies air to a first condenser and wherein a third fan selectively supplies air to a second condenser.

5. The air conditioning system of claim 4, wherein the first condenser is selectively coupled in series to the second condenser in the second operating mode.

6. The air conditioning system of claim 4, further comprising a bypass circuit, including a plurality of valves, that selectively causes the refrigerant to bypass at least one condenser depending on the operating mode.

7. The air conditioning system of claim 4, wherein only one fan supplies air in any operating mode.

8. The air conditioning system of claim 7, wherein the first condenser selectively receives and stores refrigerant in the second operating mode.

9. The air conditioning system of claim 4, wherein a receiver is arranged downstream of each of condensers.

10. The air conditioning system of claim 4, wherein the first condenser and the second condenser are arranged in parallel.

\* \* \* \* \*